June 2, 1936.  F. O. LINDGREN  2,042,719
MACHINE FOR DEPOSITING CIRCULARS INTO CONTAINERS
Filed July 2, 1932  4 Sheets-Sheet 1

Inventor
FRANK O. LINDGREN
By Paul, Paul Nelson
ATTORNEYS

June 2, 1936.          F. O. LINDGREN          2,042,719
MACHINE FOR DEPOSITING CIRCULARS INTO CONTAINERS
Filed July 2, 1932          4 Sheets-Sheet 2
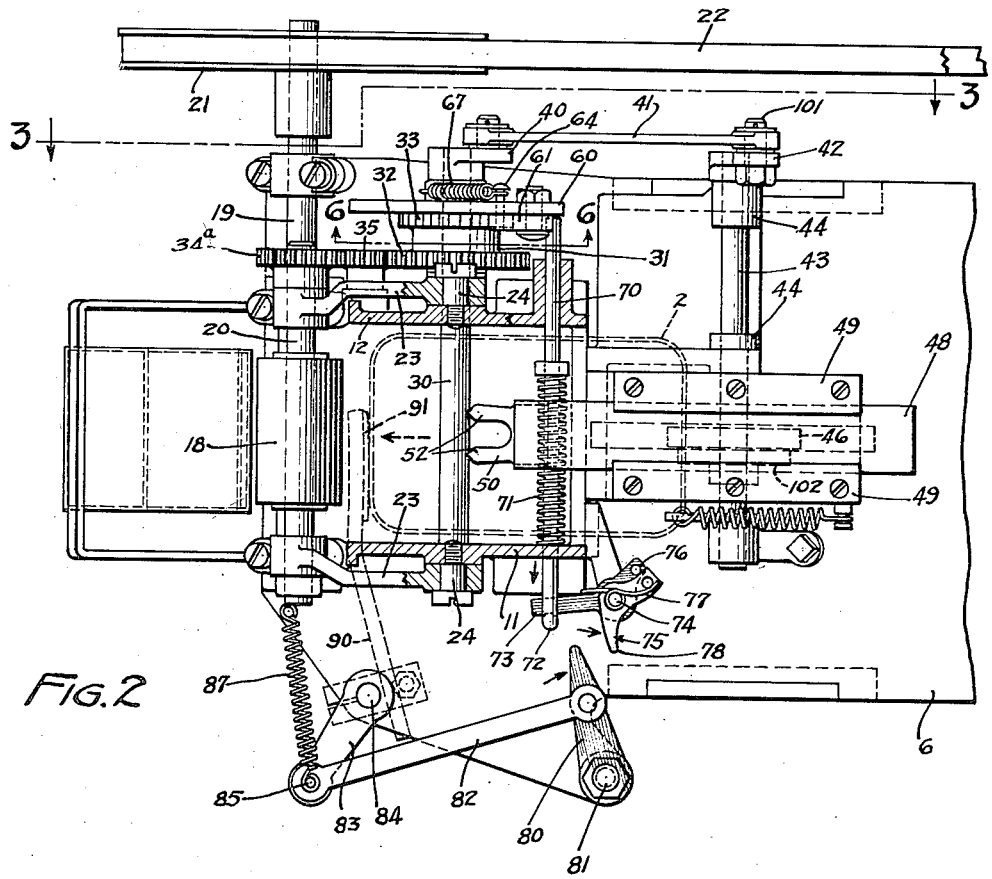
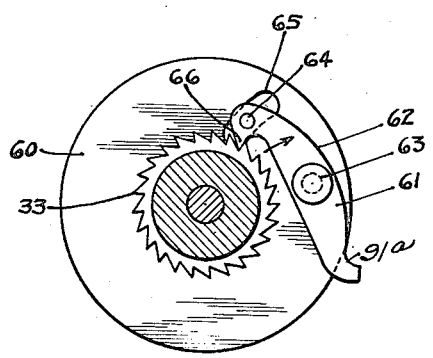
Inventor
FRANK O. LINDGREN
By Paul, Paul Moore
ATTORNEYS June 2, 1936.  F. O. LINDGREN  2,042,719

MACHINE FOR DEPOSITING CIRCULARS INTO CONTAINERS

Filed July 2, 1932  4 Sheets-Sheet 3

Inventor
FRANK O. LINDGREN
ATTORNEYS

June 2, 1936.  F. O. LINDGREN  2,042,719

MACHINE FOR DEPOSITING CIRCULARS INTO CONTAINERS

Filed July 2, 1932  4 Sheets-Sheet 4

Inventor
FRANK O. LINDGREN
By Vaul, Vaul Moore
ATTORNEYS

Patented June 2, 1936

2,042,719

UNITED STATES PATENT OFFICE 2,042,719

MACHINE FOR DEPOSITING CIRCULARS INTO CONTAINERS

Frank O. Lindgren, Minneapolis, Minn., assignor to General Mills, Inc., Minneapolis, Minn., a corporation of Delaware Application July 2, 1932, Serial No. 620,691

3 Claims. (Cl. 271—44)

This invention relates to improvements in machines for inserting circulars into containers, and is an improvement over the machine shown in my Patent No. 1,849,238 of March 15, 1932.

A general object is to provide a machine for depositing circulars one at a time into an open container, during movement of the container, although the invention is capable of other uses wherein it is desired to feed coupons or blanks into or onto an article which moves with respect to the feeding mechanism.

Features of the invention include reciprocable means for advancing the blanks or circulars to the feed means; the control of the reciprocable means by rotative means; the control of the rotative means by means of a clutch driven from a shaft, in turn driven from the rotatable feed means; the use of trigger-operated clutch control member; the use of a trigger-operated translatable clutch control member with means for operating the trigger as the result of motion of a container toward circular-receiving position; and to all details of construction shown.

Objects, features and advantges of the invention will be set forth in the description of the drawings forming a part of this application, and in said drawings:

Figure 2 is a plan section approximately on line 2—2 of Figure 1, with the parts positioned as in Figure 1, and with the slotted hopper bottom omitted;

Figure 6 is a detail section illustrating the relation of the clutch members, and taken on line 6—6 of Figure 2.

Figure 1:
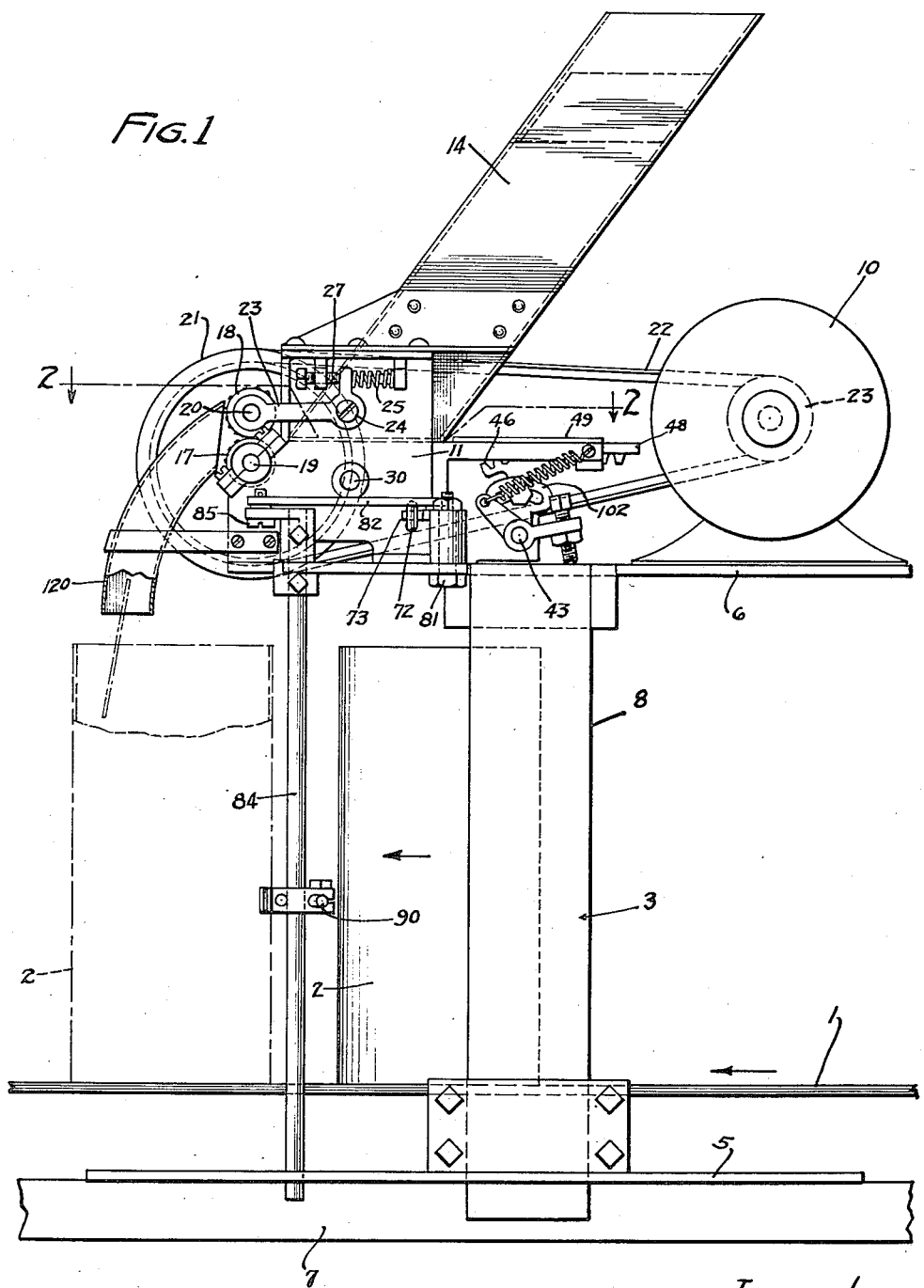
Figure 1 is a side elevation with the parts positioned as just before initiation of the circular-feeding operation by an advancing container.

Referring to Figure 1, a belt conveyor for the container is indicated at 1, a container is indicated at 2 and is positioned as immediately before it operates the clutch control mechanism, later to be described. The same container is indicated in dot-and-dash lines, as when positioned to receive the circular.

A frame generally indicated at 3 suitably supports the delivering mechanism, and includes upper and lower plates 5—6. Plate 5 is supported on a frame member 7, and the plate 6 is supported by uprights 8, so as to bridge the conveyor. The plate 6 is spaced sufficiently above the conveyor 1 to allow the container to pass beneath it. On this plate is mounted a drive motor 10.

Figure 4:
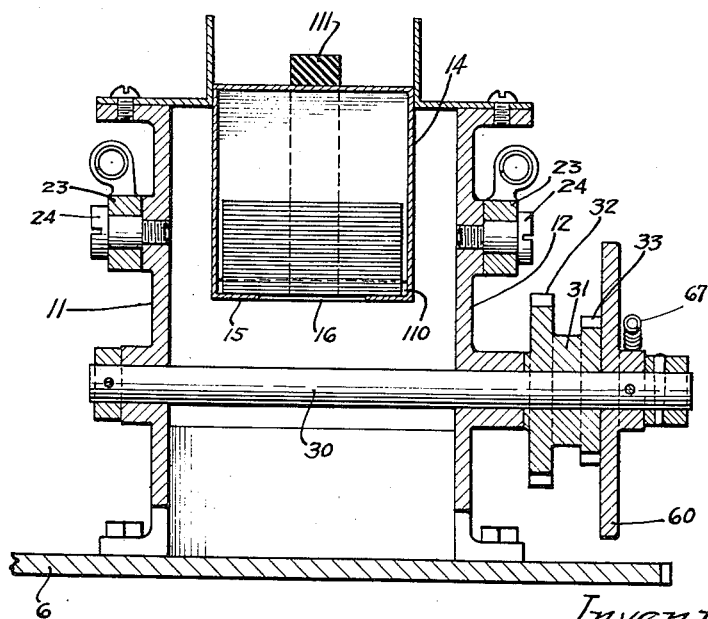
Figure 4 is a vertical cross-section on line 4—4 of Figure 3, illustrating the clutch control shaft.

Mounted also on plate 6 at the forward end are upright plates 11—12, see Figure 4, suitably bolted as shown. These uprights support the feed roll shafts and the clutch shaft later to be described, and also support the hopper generally indicated at 14. The hopper has front and rear walls which slant rearwardly and upwardly away from the feed rolls. The bottom wall 15 of the hopper is slotted as at 16 to permit the circular advancing means to engage the bottom-most circular of the pile, which is slid along the upper surface of the plate 15 toward the meeting points of the rolls. This plate 15 is continuous with the rear wall of the hopper.

Upper and lower feed rolls are respectively indicated at 17 and 18, and are supported upon corresponding shafts 19 and 20. The shaft 20 is supported in suitable bearings in plates 11 and 12, and is constantly driven by a pulley 21, in turn driven by belt 22 from a pulley 23 of the motor 10. The shaft 20 of the upper roll is held on arms 23 pivoted as at 24 to the outer surface of the uprights 11—12. Each arm has an extension engaged by spring 25, to maintain a yielding contact of the upper roll with the lower feed roll. A stop screw 27 provides means for varying the spacing of the rolls, conformably to the varying thicknesses of circular, folded or unfolded. Shafts 19—20 are geared together, the gear for shaft 20 being indicated at 34ª and gear for shaft 19 at 34.

The word "circular" is used to denote the articles to be fed, merely because the present embodiment of the invention relates to the use of the device for delivering circulars into the open tops of packages or containers. However, there is no intention to limit the invention to this use, because the device can be used for feeding other objects, including sheets of paper, thick or thin, or cardboard sheets or blanks, folded or unfolded.

Figure 5:
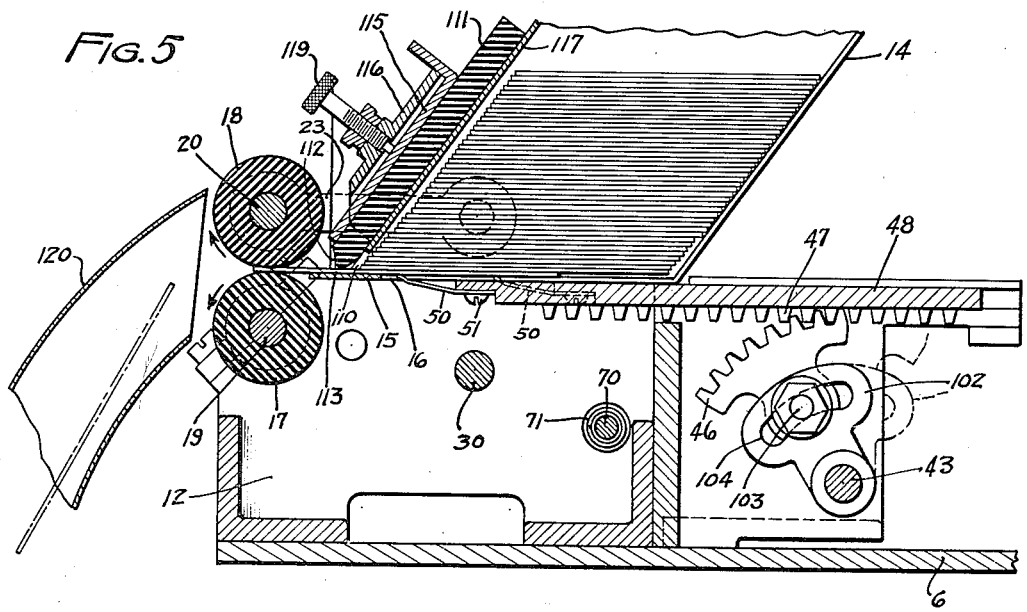
Figure 5 is a longitudinal section through the hopper and rolls, showing the advancing means in advanced position, with the circular between the feed rolls.

A clutch shaft is indicated at 30, see Figures 2 and 4, and is held as best shown in Figure 4, in suitable bearings of the plates 11 and 12. Loose upon this shaft is a rotatable clutch member 31 having a spur gear 32 and a ratchet wheel 33. The shaft 30 is operated through gear 32 by a gear train including gear 34 of shaft 19 and a gear 35 rotatable on a stub shaft attached to the plate 12. Shaft 30 is clutch-controlled to be rotated for advancing a circular to the feed rolls, when a container is in the proper position to receive the circular. To this end (see Fig. 4) shaft 30 is provided with a crank arm 40, connected by link 41 with an arm 42 connected to cross shaft 43 supported in bearings 44 attached to plate 6. Referring to Figures 2 and 5, on the cross shaft 43 is rotatably mounted a spur gear segment 46 meshing with the corresponding rack 47 of a reciprocable circular advancing element 48 operating in guides formed by plates 49, see Figure 2. This element 48 is provided at its forward end with a resilient element 50 suitably attached as at 51, see Figure 5. The element 50 has two prongs 52 adapted to engage the under surface of the bottom-most circular to feed it forwardly and introduce it between the rolls 17—18, which rolls may be considered to be one form of depositing means.

It is understood that there is no intention to limit the invention entirely to the gear and rack connection between the elements 48 and 46.

Figure 3:
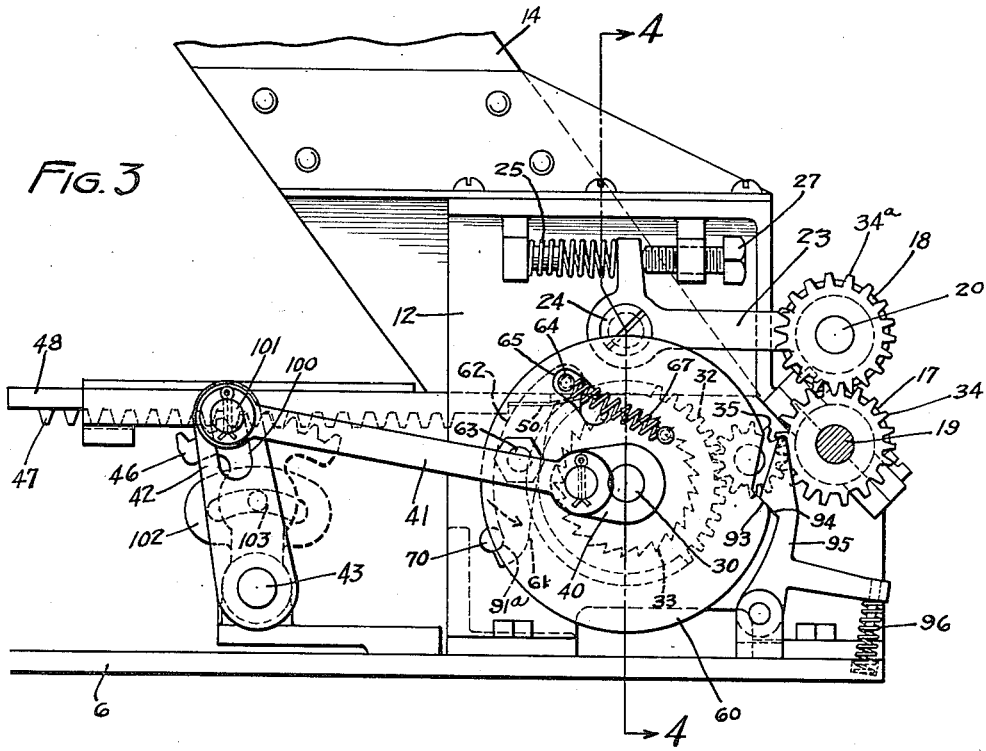
Figure 3 is a sectional elevation taken on line 3—3 of Figure 2.

The advancing mechanism is driven through the gear train previously mentioned, and through the intermediary of the clutch, the gear carrying member of which has been previously described. The other part of the clutch is formed by disk 60, see Figures 2, 3 and 6, pinned to the shaft 30. This disk has mounted thereon a pawl 61, see Figure 6, having a curved outer surface 62. The pawl is pivoted to the disk as at 63. The rocking movement of the pawl is limited by pin 64 passing through arcuate slot 65 of the disk 60. The pawl is provided with a tooth 66 which is engageable with the ratchet wheel 33 under the proper conditions. Referring to Figure 3, spring 67 attached by one end to the disk and by the other end to pin 64 is adapted to move the pawl into engagement with the ratchet 33. The ratchet wheel, disk, and pawl, are considered herein to be clutch means.

Means is provided for automatically controlling the clutch by motion of a container to throw it "in" for a sufficient length of time to advance and feed a blank to the container and thereafter to throw it "out" to stop the advancing and feeding action until a succeeding container again operates the clutch controlling means. It is, of course, understood that the elements are properly proportioned to obtain the proper synchronization. The parts are so arranged that the shaft 30 makes only one complete revolution, to obtain advancing and retracting motions of the element 48.

The clutch controlling means includes a shaft 70, see Figure 2, slidable in the upright plates 11 and 12 and parallel with the clutch shaft 30. A spring 71 moves the bar 70 toward the disk 60, to occupy a definite position with reference to the pawl 61, this position being best shown in Figure 3, wherein the pawl is shown in dotted lines. The opposite end of the bar 70 has a downturned portion 72, see Figure 1, which engages an arm 73 of part of a trigger-trip mechanism, said arm being pivoted as at 74 to a bracket attached to the plate 11, see Figure 2. The arm 73 is controlled by a trigger 75 also rotatable on pivot 74, one end of this lever-like trigger being normally engaged with the pin 76 of the lever 73. Spring 77 acts to hold one arm of the lever 75 in engagement with the pin 76. It is noted that by this arrangement, the element 75 can move independently of lever 73 about the pivot 74, and when the arm 78 of the lever 75 is moved in direction of the arrow, the lever 73 and rod 70 are moved in the directions of respective arrows, to release pawl 61 and allow it to assume the position shown in Figure 6, that is to let or throw the clutch in.

For operating the trigger as a result of motion of a container, an arm 80 is provided. This arm is pivoted to plate 6 by bolt 81. Referring to Figures 1 and 2, pivoted to the arm 80 is a link 82 in turn pivoted to arm 83 of vertical shaft 84. This shaft is rotatably stepped in plates 5 and 6, see Figure 1. Attached to the pivot 85 which connects the link 82 with arm 83 is a spring 87 adapted to rotate the shaft 84, in this instance in clockwise direction to normally hold the arm 80 in the position shown in Figure 2. Suitably adjustably attached to the shaft 81 is an arm 90 (see dotted line position in Figure 2) which extends into the path of movement of the container 2, see also Figure 1. The arm may have a flattened surface formed by a plate 91, arranged at its outer extremity, which plate 91 is engaged by the container. When the container strikes the arm 90 (or plate), the shaft is moved in counter-clockwise direction, the arm 80 is correspondingly moved and engages the trigger 78, pulling the shaft 70 to release the clutch, which thereafter automatically goes in, or in other words, the pawl is permitted to engage the ratchet. The arm 80 moves beyond the arm 78 during this movement, to release the arm 75 so that the spring 71 immediately returns the rod 70 to the position shown in Figure 2. The end of the rod 70 is, therefore, again and immediately interposed into the path of the pawl 61. Referring to Figures 3 and 6 and assuming a counter-clockwise motion of the disk 60 in Figure 6, it will be seen that when the rod 70 re-assumes the position shown in Figure 3 (after tripping) and as the disk rotates, and after the major part of the complete rotation has occurred, the surface 62 of the pawl engages the rod 70, and the pawl is thus moved in direction of the arrow to the released position, shown in dotted lines in Figure 3. After release, the curved portion 91ª engages the terminal of rod 70, as a stop, to limit further movement of the disk 60, due to its momentum after release of the pawl or clutch. This stop 91ª constitutes, with the rod 70, means for preventing over-run of the clutch member which operates the circular-advancing means.

On the other hand, in order to be sure that the disk will rotate far enough to cause the parts to assume the position shown in dotted lines in Figure 3, the disk 60 is provided with a notch having an inclined portion 93, this inclined portion is engaged by a corresponding inclined portion 94 of an arm 95 which arm is pressed toward the disk by spring 96, and acts as a brake. Should it happen that the disk does not rotate quite far enough to bring the curved portion 91ª against the rod 70, the force applied by the spring to the arm 95 causes surface 94 to ride on surface 93 and move the disk sufficiently in clockwise direction to make the parts 91ª and 70 assume the position shown. Means is thus provided to prevent clutch under-run. Movement of the pawl in the direction of the dotted arrow of Figure 3 is prevented by the engagement of the pin 64 with the upper end of the slot 65.

Referring to Figure 3: The arm 42 is provided with a radial slot 100, and the pivot pin 101 connecting the link 41 to the arm 42 is adjustable in the slot to provide for slight throw-adjustment for arm 42. In order that the segmental spur gear may be adjusted relative to the shaft 43, to correspondingly adjust the advancing element 48, it is loosely mounted on the shaft, but is adjustably attached to element 102 fixed to shaft 43, see Figures 3 and 5. The adjusting means comprises a suitable setting bolt 103, passing through an arcuate slot 104 of the element 102.

Referring to Figures 5 and 6, another feature of this invention relates to means for preventing more than one folded or other circular or blank from being fed from the hopper to the feed rolls. To this end, the feed opening 110 in the forward wall of the hopper is made of the desired vertical height. On the outer wall and between the wall and the feed rolls 17—18, there is adjustably arranged a rubber element indicated at 111 having a lower edge 112 which forms with the plate 15 a throat 113 which will only allow one folded circular to pass.

The rubber element 111 or its equivalent forms with the support 15 a throat, the size of which is automatically variable conformably to the thickness of the fed circular, and only permits ejectment of a single circular, whatever the thickness. As shown, this member is arranged midway of the circular in a direction transverse to line of feed. However, the throat formed by the rubber member and the plate 15 may extend the full width of the blank.

In this embodiment of the invention, the rubber element is only about five-eighths of an inch wide. Ordinarily these cartons are about two and one-half inches wide, in direction transverse to the direction of feed. The rubber element 111 is clamped in position by means of a plate 115 engaging the rubber within a channel formed by the U-shaped element 116 attached to the forward wall 117 of the hopper. A set screw 119 clampingly secures the plate 115 against the rubber element.

Figure 7:
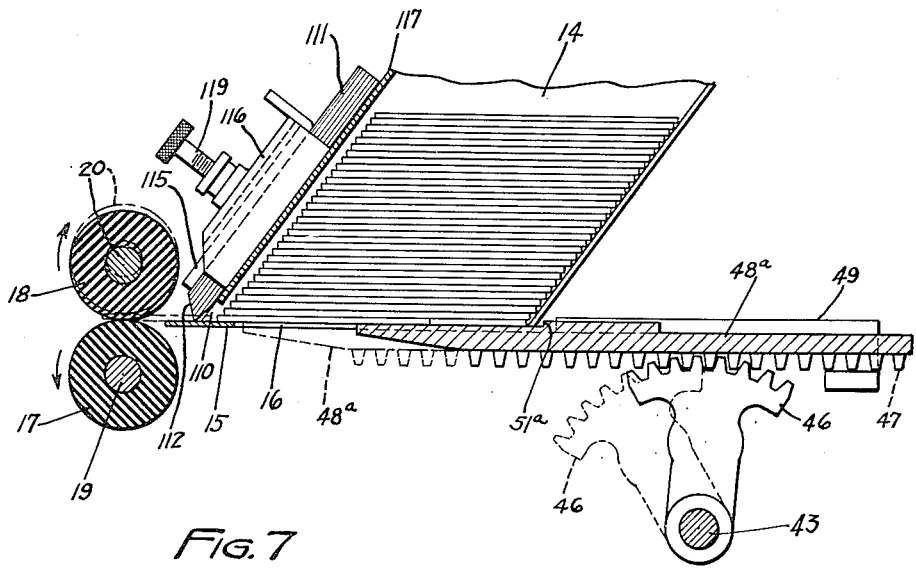
Figure 7 is a view similar to Fig. 5 showing a modification of the structure of the circular-advancing means particularly adapted for a blank having a greater thickness.

In Figure 5, the circulars are fed by spring fingers which engage the under surface of the bottom-most circular. In Figure 7, a modification has been shown in which the reciprocable element 48ª is provided with a shoulder 51ª which engages the rear end of a somewhat thicker circular.

Each circular is deposited by the feed rolls into a curved tubular member 120, arranged to guide the circular into the container in a manner shown in Figure 1. It will be noted that the blank-advancing element is moved by a rotative member, and that it is controlled by the drive for the feed rolls.

*Operation*

Assuming the parts positioned as shown in Figures 1 and 2: The carton 2 traveling in the direction of the arrow engages the arm 90, see Figure 2, and rotates shaft 84 in counter-clockwise direction moving the arm 80 in clockwise direction and causing it to engage the portion 78 of trigger 75 to move the clutch control bar 70 away from the disk 60, and release the pawl for clutching engagement. Inasmuch as shaft 19 is constantly rotating and inasmuch as the shaft 30 which drives the disk 60 is gear-operated from the shaft 19, disk 60 immediately rotates one revolution during which, because of the operating connections between the shaft 30 and the shaft 43, the slide 48 is advanced, and its fingers engage and move a circular forwardly to the position shown in Figure 5 from which position, the circular is fed by the feed rolls and deposited into the tubular member 120, whence it is delivered to the carton 2 which has now reached the forward position. This feeding action is rapid and the disk makes one complete revolution and stops in its previous position, that is in the position best shown in Figure 3. After releasing the pawl, the rod 70 immediately assumes its original position, and is engaged by the surface 62 of the pawl and, as the rotation of the disk 60 continues, the pawl is rocked until finally it is disengaged from ratchet wheel 33 (or the clutch is opened) to assume the final position in which the stop 91ª engages the rod as shown in Figure 3. During this motion, the arm 95 is riding on the periphery of the disk 60 and if the disk does not have sufficient momentum after the pawl is released (or the clutch withdrawn) the surface 94 sliding along the surface 93 acts under the impulse of spring 96 to positively move the disk 60 in clockwise direction to cause the stop 91ª to engage the rod 70, as shown. The braking effect of the arm 95 reduces jarring and prevents under-run.

The driving mechanism is designed to act speedily so that the clutch element 60 gains considerable momentum during the cycle of operation. When the clutch goes in, the disk 60 is given a quick rotation, and makes only one complete rotation, at or near the end of which the clutch is opened.

I claim as my invention:

1. In a machine of the class described, a hopper for supporting the circulars in flatwise relation, said hopper comprising a bottom wall having an elongated opening therein extending lengthwise of the circulars, an opening in a wall of the hopper through which the circulars are fed, one at a time therefrom, and a resilient element normally bridging said discharge opening and adapted to yield in the direction of travel of the circular, when engaged thereby, to permit the circular to pass between it and the bottom wall of the hopper.

2. In a machine of the class described, a hopper for supporting the circulars, said hopper comprising a bottom wall having an elongated opening therein, a member mounted for reciprocal movement beneath said bottom wall and having yieldable fingers movable in said opening and adapted to engage the lowermost circular, said hopper having a discharge opening in a wall thereof relatively wider than the thickness of the circulars, a resilient element adjustably secured to a wall of the hopper and overhanging said discharge opening and having its lowermost end substantially engaging the bottom wall of the hopper, said resilient element being adapted to yield in the direction of travel of the circular, when engaged thereby, whereby but one circular can be fed from the hopper at a time.

3. In a machine of the class described, a hopper for supporting the circulars, said hopper having a bottom wall provided with a discharge opening, a resilient element normally bridging said discharge opening and adapted to yield in the direction of travel of the circulars and upwardly when engaged thereby to permit the circulars to pass between said element and the bottom wall of said hopper, and means for moving the circulars one at a time into contact with said element.

FRANK O. LINDGREN.